Dec. 24, 1935.   N. B. BENSON   2,025,633
RECORD FILING APPLIANCE
Filed Dec. 4, 1933   4 Sheets-Sheet 3

Inventor
N. B. Benson
By F. B. Wooden.
Attorney

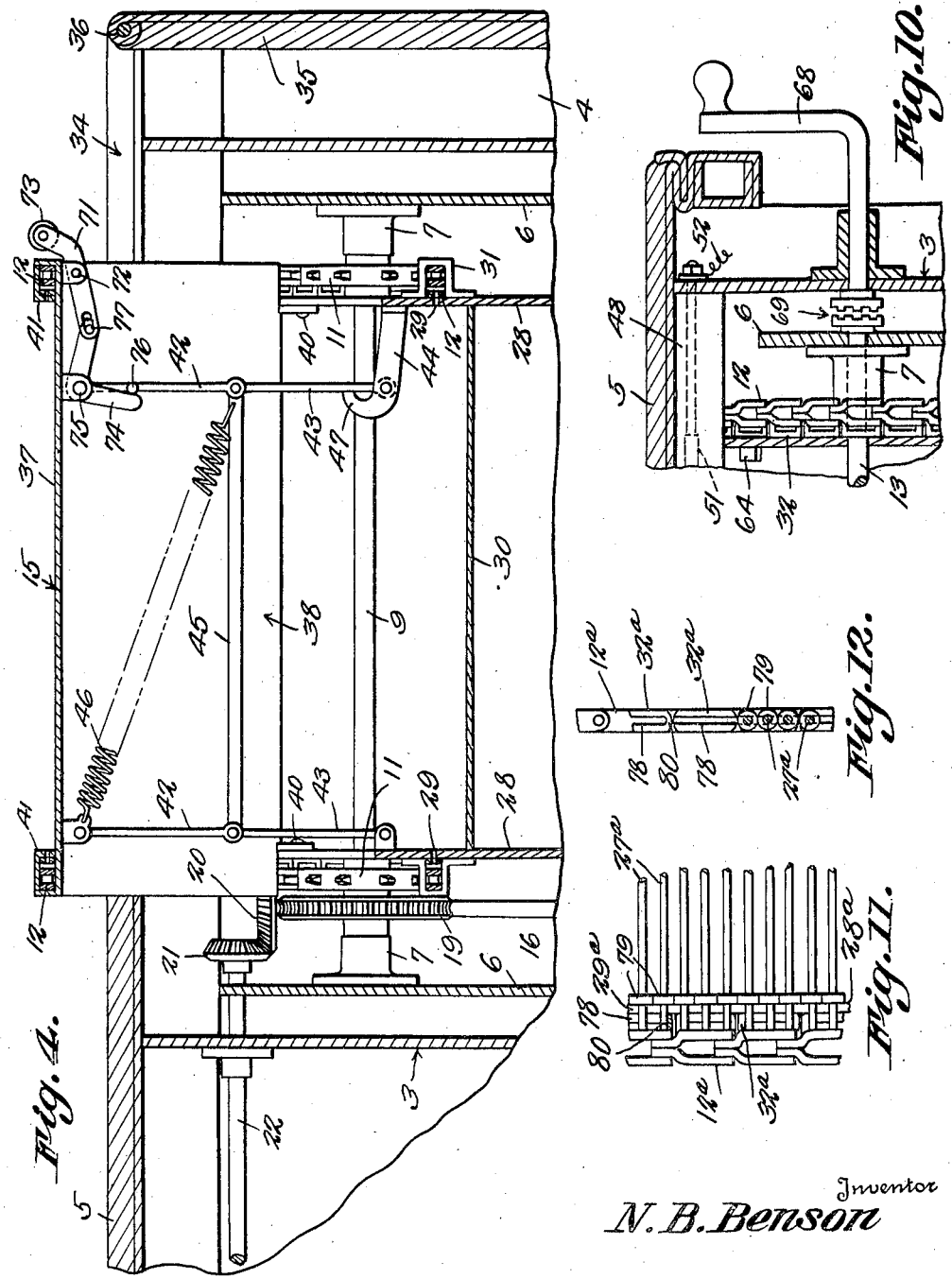

Patented Dec. 24, 1935

2,025,633

UNITED STATES PATENT OFFICE 2,025,633

RECORD FILING APPLIANCE

Newell B. Benson, Baltimore, Md.

Application December 4, 1933, Serial No. 700,922

17 Claims. (Cl. 129—16.1)

This invention relates to the art of loose leaf filing appliances and more particularly to a device for filing in alphabetical, numerical, or other predetermined arrangement, a series of records.

It has for one of its objects, the embodiment of a device in which a large number of records may be housed, any one of which can be accurately, conveniently and expeditiously made available for use; another object is the provision of mechanism whereby the record desired, may be mechanically advanced to a position for inspection or entry and automatically stopped at that position; another object is the provision of a movable writing table which automatically moves into position, when the device is opened for use; another object is the provision of a device, the structure of which may be completely housed and protected when not in use; another object is the provision of means for manually operating the device should it be so desired.

Other objects and advantages will present themselves as the description proceeds, it being the intention of the present invention to enhance the utility of devices of that class to which it belongs, it being understood that changes may be made in the structure of the device within the scope of what is claimed without departing from the spirit of the invention or sacrificing any of the advantages thereof.

In the drawings:—

Figure 4 is a transverse sectional view of a portion of the structure, the section being taken on line 4—4 of Figure 3.

Figure 5 is an enlarged sectional view of a portion of the mechanism.

Figure 6 is a bottom plan view of a number of the switches shown in Figure 5.

Figure 7 is a detail view of a portion of the structure shown in Figure 5.

Figure 8 is a diagrammatical view of the electrical circuits used in connection with the device.

Figure 9 is a fragmentary detail sectional view of a portion of the device.

Figure 10 is a detail sectional view of a portion of the device depicting means for manually operating the device.

Figure 11 is a detail plan view showing a slight modification in the carrier portion of the device.

Figure 12 is a view in elevation of the structure shown in Figure 11 there being parts broken away and parts in section.

Figure 1:
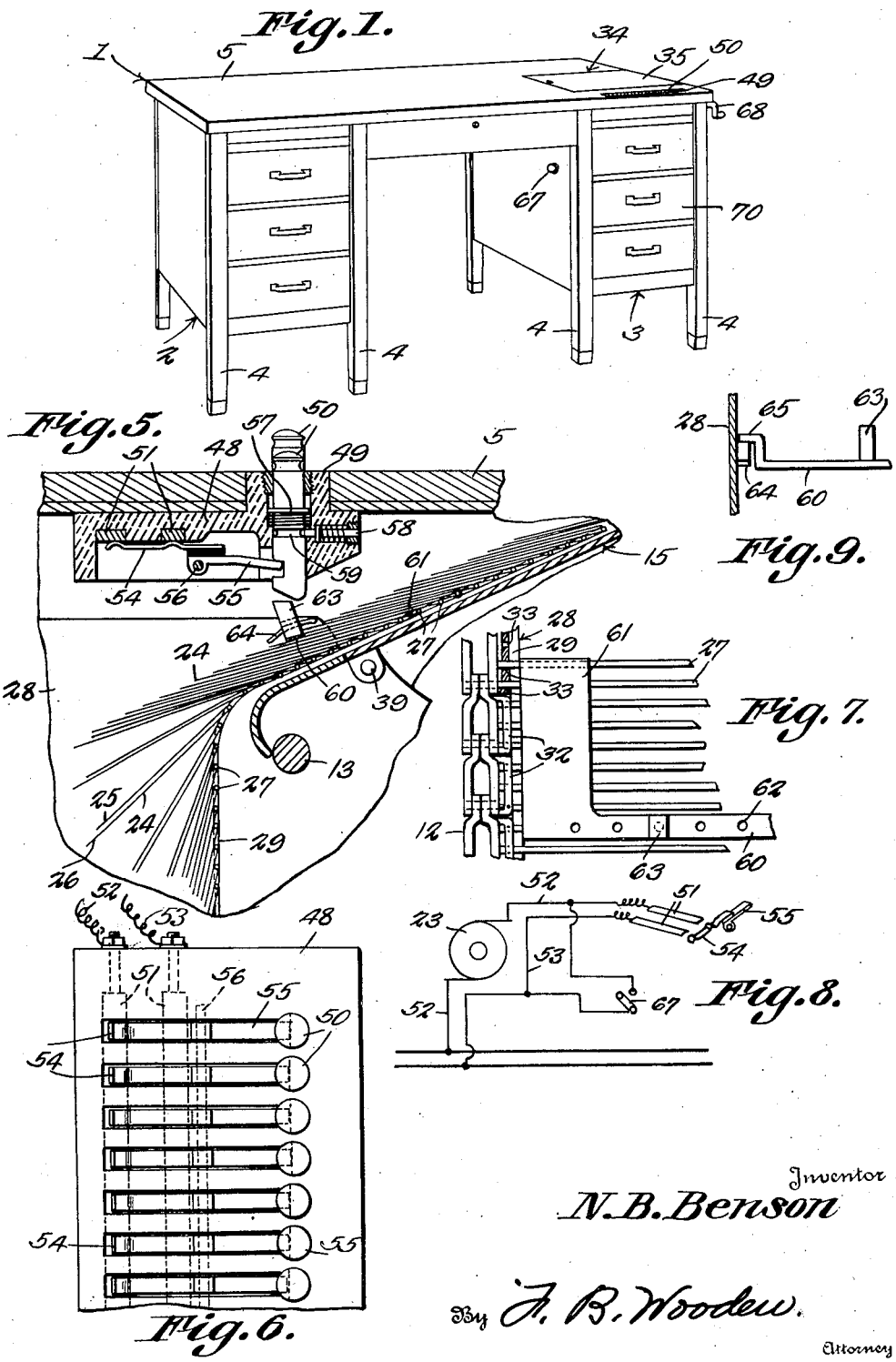
Figure 1 is a perspective view of the device.
Figure 2:
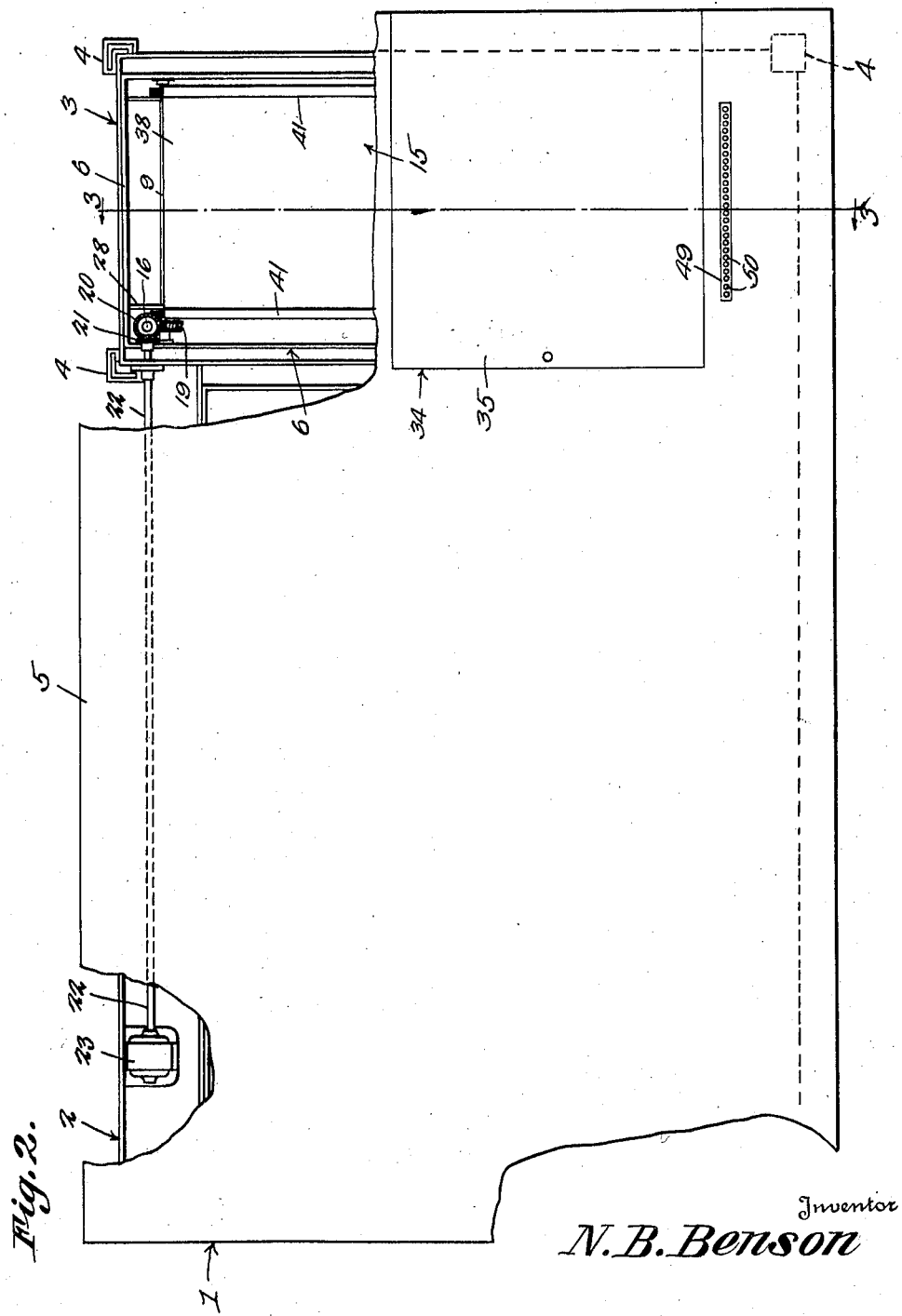
Figure 2 is a plan view, there being parts cut away.
Figure 3:
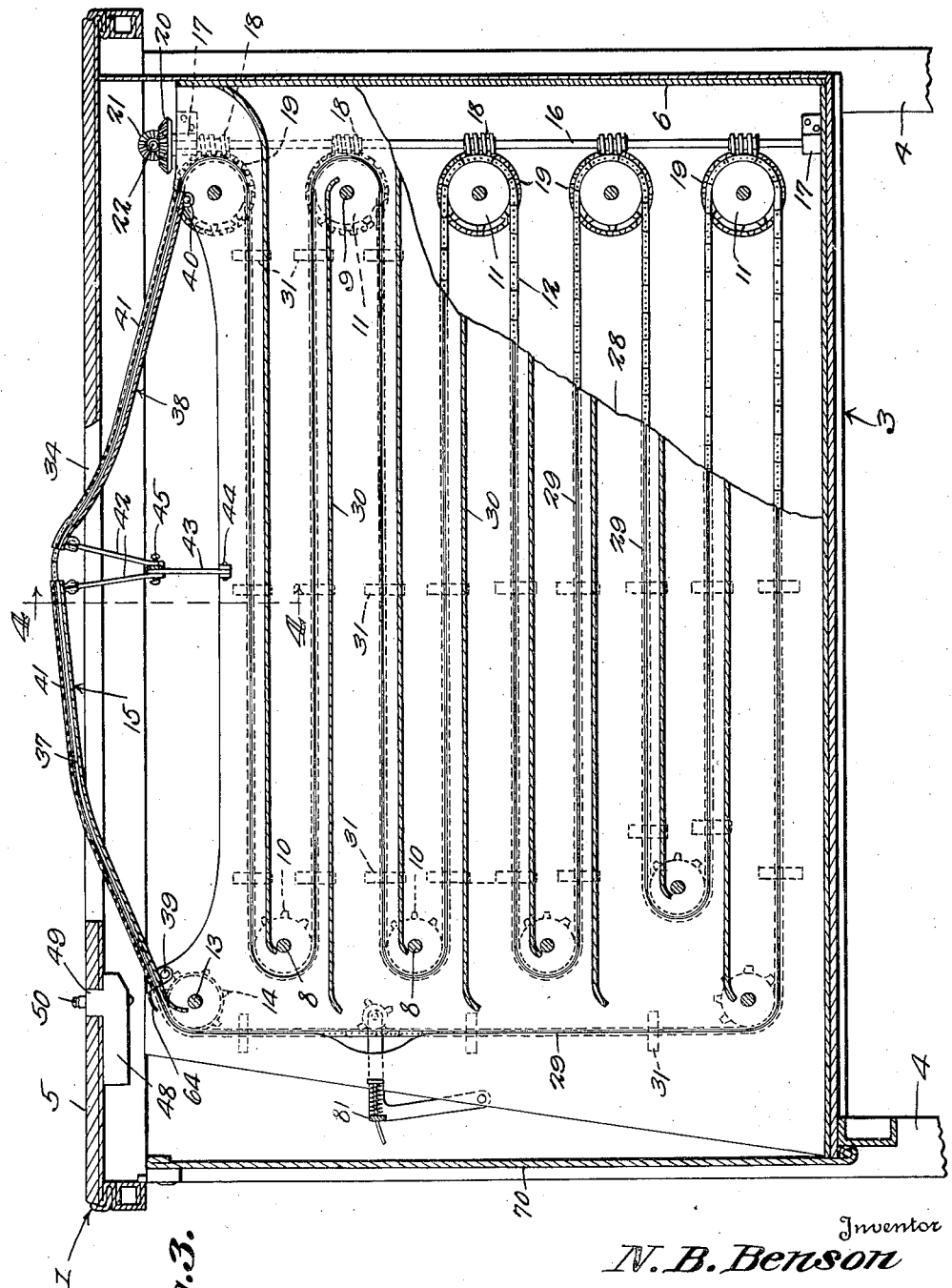
Figure 3 is a longitudinal sectional view of the device, the plane of the section being taken on line 3—3 of Figure 2.

Referring to the drawings by characters of reference; I designates a desk comprising end pedestals 2 and 3, having legs 4 and a top 5. The desk as illustrated resembles in appearance the well known office desk in which the end pedestals provide housing for a number of drawers. In the present invention, drawers in the pedestal 3 have been dispensed with and in their stead a slidable housing 6 is inserted. The side walls of the housing 6 provide support for bearings 7 which in turn support shafts 8 at one end of the casing and shafts 9 at the other end. The shafts 8 and 9 have secured thereto near the ends thereof chain sprocket wheels 10 and 11 respectively. The shafts 8 and sprockets 10 are idlers, whereas the shafts 9 and sprockets 11 are driven. An endless conveyor chain 12 is trained over the sprockets 10 and 11 as shown and is led from the lowermost sprockets 10 upwardly to a shaft 13 over sprockets 14 secured to the last mentioned shaft and thence over an inclined work table 15 back to the uppermost sprockets 11.

A vertical shaft 16 is mounted for rotation in bearings 17 at one side of the housing near the shafts 9 and has secured thereto a worm gear 18 for each of said shafts. The gears 18 mesh with worm wheels 19 secured to the shafts 9, whereby the conveyor chain may be driven from a plurality of points along its length without undue strain thereon.

Secured to the upper end of the shaft 16 is a bevel gear 20, the same being driven by a bevel pinion 21 secured to the end of a shaft 22.

A motor 23 is mounted in the pedestal 2 back of the drawers in said pedestal. The shaft 22 is an elongation of the motor shaft and extends as shown back of the central drawer of the desk. It will be apparent that the device herein disclosed may be adapted for use in many forms of tabulating and recording operations. In the present instance however a bookkeeping system will be alluded to.

The cards or loose leaves used in the device may be any one of the present commercial forms. As illustrated they each embody a sheet 24, folded to provide two overlapped leaves 25 and 26, leaf 25 being the shorter. Upon the exposed portion of the leaf 26 may be placed the name or symbol, identifying that particular sheet. The sheet 24 at its fold is looped over a supporting rod 27. The rod is sufficiently stiff to carry the sheet along without bending, yet has resiliency enough to permit it being manually bent, for a purpose to be presently apparent.

Shield plates 28 extend longitudinally of the member 6 and are provided with slots 29 therethrough, the slots being formed on the pitch line of the chain 12 and sprockets 10 and 11.

Supporting plates 30 extend transversely between the shield plates and under the slots 29 as shown. Plates or straps 31, overlap the edges of the slots 29 to hold the edges of the slots in spaced relation.

Secured to the links of the carrier 12 are plates 32 having holes 33 formed therein, the holes being formed along the plates in spaced relation corresponding in length to the exposed portion of the leaf 26.

As hereinbefore mentioned the rods 27 are resilient thereby rendering it possible to spring the rod sufficiently to enter its ends into holes 33 at opposite sides of the device. After placing the sheets 24 on the rods 27 and connecting the rods to the carrier, the sheets will be superimposed as shown particularly in Figure 5 with the index portion of all the leaves exposed for view when moved to working position.

The top of the desk above a portion of the housing 6 is cut away to provide an opening 34, a closure 35 for the opening is pivoted at 36 to one side edge of the desk.

To facilitate the making of entries on the sheets the inclined work table 15 is provided. The table comprises parts 37 and 38 pivoted at their outer ends at 39 and 40 respectively. A chain guide 41 is mounted on the table 15 and leads the chain out of the housing over the table and returns the chain to the housing. Links 42 are pivotally connected to the free ends of the table sections 37 and 38, other links 43 are pivotally connected to the links 42 and to brackets 44 secured to the plates 28. The links 42 and 43 are pivotally connected to a bar 45. A retractile spring 46 has one end attached to the bar 45, the other end being anchored to the table. By reason of the structure just described the table is held in working position and may be depressed below the surface of the desk by closure of the lid 35, the spring 46 acting to automatically raise the table to working position upon removal of the lid 35. A stop 47 prevents the links 42 and 43 from swinging over a dead central position.

Mechanism for advancing the sheets to working position on the table and for automatically stopping the sheets in position to be used will now be described. A bar of insulation 48 has a projecting portion 49 extending through a slot transversely of the desk. Mounted in bores formed in the portion 49 are a series of switch buttons 50, the number of buttons corresponding to the number of tabulated groups of sheets to be used in the device, for instance should the matter contained in the machine be alphabetically arranged there would be twenty six switch buttons 50. Contact bars 51 are carried by the block 48. A conductor 52 leads from one of the bars to the motor and thence to a source of electrical supply, a second conductor 53 is attached to the other bar 51 and leads directly to the other side of the supply circuit. A bridge 54 for each of the buttons 50 is provided and is secured to a lever 55 pivoted at 56, the end of the lever 55 rests in a notch formed in the button 50. When the button 50 is depressed against the action of a spring 57, the bridge 54 closes the circuit to the motor. The button is held in depressed position by a spring actuated plunger 58, the end of which rides into a groove 59 formed in the shank of the button.

A switch release comprises a bar 60 having supporting arms 61 at opposite ends thereof, the bar having a width equivalent to the width of the exposed portion of the leaf 26 and the arms 61 being the length of the sheet 24 and carried by a rod 27 so that the said release will take the place of one sheet assembly. The release bar 60 has a series of openings 62 said openings registering in a vertical plane with the buttons 50.

A tappet 63 is secured to the bar 60, its path of forward movement being in position for engaging its complementary key 50. The bars 60 are placed along the length of carrier in positions so that as any particular group of leaves 24 arrive over the work table the tappet 63 will have arrived at the particular key for the group under consideration and force the key upwardly thereby breaking the circuit to the motor. To provide positive release of the key 50, a cam 64 is secured to the side wall or plate 28 adjacent the line of keys or buttons 50. A lug 65 carried by the end of the bar 60 rides over the cam at the position in which the button 50 and the tappet 63 contact. Elongation of the slot in the shank of the button 50 reduces sparking at the switch points to a minimum.

A switch 67 conveniently located for manipulation and shown in the drawing as being adapted for operation by the knee of an operator seated at the desk, controls a circuit to the motor, whereby the operator through the motor drive may by short applications of the switch 67, impart a step-by-step movement to the carrier. A crank 68 at one end of the desk and in alignment with the shaft 13 may be used in connection with the switch 67, to retard motion of the carrier and to halt the carrier with a particular leaf on the table. A clutch 69 on the shaft and crank permit the crank to remain idle during motor operation of the mechanism.

A door 70 closes the front of the compartment in which the mechanism is located. Should it be necessary to inspect the mechanism, the entire structure may be withdrawn through the door opening.

A lever 71 pivoted at 72 to the table 15 carries a roller 73, a bell-crank lever 74 pivoted at 75 to the table 15, has one arm in engagement with a pin 76 on the link 42. The levers 71 and 74 are pivotally connected to operate in unison by a pin and slot 77. In closing the device, the lid 35 contacts the roller 73 depressing the end of the lever 71 and swings the lever 74 to move the pin 76 to the right in Figure 4 and break the right line position of the toggle 42, 43, so that closure of the table may be effected.

In the structure illustrated in Figures 11 and 12 the parts corresponding to parts heretofore described have the same numerals applied thereto, with the addition of the suffix "a". The plates 32a carried by the chain 12a have longitudinal slots 78 to receive the ends of the rods 27a. Spacing plates 79 are secured to the rods 27a adjacent the shield plates 28a. At intervals along the length of the conveyor 12a the slots 78 are closed as shown at 80 to provide means for carrying the rods 27a forwardly, the elements 79 and 80 performing the function of the spaced openings 33.

A spring actuated chain tightener 81 is interposed in the carrier 12, for the purpose of holding the chain taut at all times, particularly when the table 15 is being folded.

It is thought operation of the device will be evident from the foregoing description and that a detail summary will be unnecessary.

It might be stated that in the drawings, in the interest of clarity and economy, elements having a multiplicity of duplicate parts have been in most part omitted.

What is claimed is:

1. In a device of the class described, a support having an opening, a removable closure for the opening, a work table, means for mounting the work table in the support in operative relation to the opening, an endless carrier, means for mounting leaves on the carrier, means for mounting the carrier in the support for advancement, thereby to bring any leaf upon the table, and means for moving the work table toward the opening, when the closure assumes open position with respect to the opening.

2. In a device of the class described, a support having an opening, a removable closure for the opening, a work table, means for mounting the work table in the support for movement toward and away from the opening, an endless carrier, means for mounting leaves on the carrier, means for mounting the carrier in the support for advancement, thereby to bring any leaf upon the table, and means for moving the work table toward the opening, when the closure assumes open position with respect to the opening.

3. In a device of the class described, a support having an opening, a removable closure for the opening, a work table, means for mounting the work table in the support in operative relation to the opening, an endless carrier, means for mounting leaves on the carrier, means for mounting the carrier in the support for advancement, thereby to bring any leaf upon the table, and yieldably-actuated means for automatically moving the work table toward the opening, when the closure assumes open position.

4. In a device of the class described, a support having an opening, a removable closure for the opening, a work table, means for mounting the work table in the support in operative relation to the opening, an endless carrier, means for mounting leaves on the carrier, means for mounting the carrier in the support for advancement, thereby to bring any leaf upon the table, and yieldably-actuated means for automatically moving the work table toward the opening, when the closure assumes open position, the closure, when in closed position, engaging the yieldably-actuated means and moving the work table to housed position in the support, against the action of said yieldably-actuated means.

5. In a device of the class described, a support having an opening, a removable closure for the opening, a work table comprising relatively movable parts, means for mounting the outer ends of said parts movably on the support, and yieldably-actuated means assembled with the inner ends of said parts of the work table for moving the inner ends of said parts of the work table to operative position with respect to the opening, an endless carrier, means for mounting leaves on the carrier and means for mounting the carrier in the support for advancement, thereby to bring any leaf upon the table.

6. In a device of the class described, a support having an opening, a removable closure for the opening, a work table comprising relatively movable parts, means for mounting the outer ends of said parts pivotally on the support, an endless carrier, means for mounting leaves on the carrier, means for mounting the carrier in the support for advancement, thereby to bring any leaf upon the table, means for moving the inner ends of said parts of the work table to operative position with respect to the opening including pairs of links, the links of each pair having their inner ends pivotally connected together, the outer end of one link of each pair being movably connected to the inner end of one of said parts of the work table, other links each having its outer end pivotally connected to the inner ends of one pair of links, the inner ends of said other links being pivotally connected to the support.

7. In a device of the class described, a support having an opening, a removable closure for the opening, a work table comprising relatively movable parts, means for mounting the outer ends of said parts pivotally on the support, an endless carrier, means for mounting leaves on the carrier, means for mounting the carrier in the support for advancement, thereby to bring any leaf upon the table, and pairs of links, the links of each pair having their inner ends pivotally connected together, the outer end of one link of each pair being pivotally connected to the inner end of one of said parts of the work table, other links each having its outer end pivotally connected to the inner ends of one pair of links, the inner ends of said other links being pivotally connected to the support, and a bar pivotally connected with the links of each pair and cooperating with the table and the other links to form an approximate rectangle, a pull spring arranged substantially at a diagonal, of said rectangle, means for connecting one end of the pull spring to the bar, and means for anchoring the opposite end of the spring to the table, the links, the bar, and the spring constituting means for automatically moving the inner ends of said parts of the work table to operative position with respect to the opening.

8. In a device of the class described, a support, a leaf carrier, means for mounting the leaf carrier movably on the support, a table, mechanism for actuating the carrier to bring any leaf into working position with respect to the table, and means for stopping the movement of the carrier with the selected leaf in working position, said position permitting an operator to make an entry on the leaf without withdrawal of the leaf from the carrier.

9. In a device of the class described, a support, a table, a leaf carrier, means for mounting the leaf carrier movably over the table, mechanism for actuating the carrier to bring any leaf into working position with respect to the table, means under the control of an operator for putting said mechanism into operation, and coacting means on the carrier and on the support for stopping said mechanism with the selected leaf in working position, thereby permitting an operator to make an entry on the leaf without withdrawal of the leaf from the carrier.

10. In a device of the class described, a support, a leaf carrier, means for mounting the leaf carrier movably on the support, a table, an electric motor operatively connected to the leaf carrier, a motor circuit, selecting switches in said circuit and individual to different leaves on the carrier, the switches being under the control of an operator and constituting means for putting the motor into operation, thereby to bring a selected leaf into working position on the table, and means mounted on the carrier and engageable with the switch which the operator has actuated, to render said switch inactive, to stop the movement of the carrier, and leave the selected leaf in fixed working position.

11. In a device of the class described, a support, a carrier movably mounted on the support, a table, means for mounting groups of leaves on the carrier, mechanism for actuating the carrier to bring a selected group of leaves into working position on the table, means for stopping the movement of the carrier with any selected group in working position, and means for imparting a further movement to the carrier, to bring a particular leaf of any group into working position.

12. In a device of the class described, a support, a work table, a leaf carrier, means for mounting the leaf carrier movably over the table, an electric motor operatively connected to the leaf carrier, a motor circuit, selecting switches in said circuit and individual to different groups of leaves on the carrier, the switches being under the control of an operator and constituting means for putting the motor into operation, thereby to bring a selected group of leaves into working position on the table, means mounted on the carrier and engageable with the switch which the operator has actuated, to render said switch inactive, to stop the movement of the carrier, and leave the selected group of leaves in fixed working position, and means for imparting a further movement to the carrier, to bring a particular leaf of any group into working position.

13. In a device of the class described, a support having an opening, a removable closure for the opening, a work table, means for mounting the work table in the support in operative relation to the opening, an endless carrier, means for mounting leaves on the carrier, means for mounting the carrier in the support for advancement thereby to bring any leaf upon the table, yieldably-actuated means for automatically moving the work table toward the opening, when the closure assumes open position and means for automatically operating the yieldably-actuated means, to close the work table when the closure is moved toward the opening.

14. In a device of the class described, a support having an opening, a removable closure for the opening, a work table comprising relatively movable parts, means for mounting the outer ends of said parts pivotally on the support, an endless carrier, means for mounting leaves on the carrier, means for mounting the carrier in the support for advancement, thereby to bring any leaf upon the table, pairs of links, the links of each pair having their inner ends pivotally connected together, the outer end of one link of each pair being movably connected to the inner end of one of said parts of the work table, other links each having its outer end pivotally connected to the inner ends of one pair of links, the inner ends of said other links being pivotally connected to the support, said links being movable to an approximately vertical position with respect to the table and parallel position with respect to each other to constitute a support for the inner ends of the work table, and means coacting with the closure and with the links for moving the pairs of links and the other links to angular relation with respect to each other, thereby to permit lowering the work table.

15. In a device of the class described, a support, a leaf carrier having recording leaves thereon, means for movably mounting the leaf carrier on the support, a table for supporting the leaves, mechanism for actuating the leaf carrier to move a selected leaf into working position on the table, said position permitting an operator to make an entry on the leaf while the leaf is attached to the carrier and means for stopping the movement of the carrier with the selected leaf in working position.

16. In a device of the class described, a support, a table, a conveyor mounted for movement over the table, a record supporting device carried by the conveyor, the conveyor comprising approximately parallel, spaced, flexible elements and having openings spaced longitudinally of the flexible elements, the record supporting device comprising a resilient rod capable of being shortened by bowing to permit insertion of the end of the rod in the openings of the conveyor, means for preventing longitudinal movement of the rod in the conveyor, and means for moving the carrier over the table.

17. In a device of the class described, a support, a table, a conveyor mounted for movement on the support and for movement over the table, record supporting devices carried by the conveyor, a motor driven gear train for moving the supporting devices over the table, a switch for controlling the motor drive and means for stopping the conveyor with a particular record on the table, said means comprising a bar carried by the supporting device and having a tappet individual to the particular record to be stopped on the table, said tappet being adapted to engage and release the switch with the particular record in working position on the table.

NEWELL B. BENSON.